(12) United States Patent
Whitaker

(10) Patent No.: US 8,720,810 B2
(45) Date of Patent: May 13, 2014

(54) SPOOL FOR TELECOMMUNICATIONS CABLE AND METHOD

(75) Inventor: Jerad Whitaker, Richfield, MN (US)

(73) Assignee: ADC Telecommunications, Inc., Berwyn, PA (US)

(*) Notice: Subject to any disclaimer, the term of this patent is extended or adjusted under 35 U.S.C. 154(b) by 566 days.

(21) Appl. No.: 13/025,779

(22) Filed: Feb. 11, 2011

(65) Prior Publication Data

US 2012/0205477 A1 Aug. 16, 2012

(51) Int. Cl.
B65H 75/38 (2006.01)

(52) U.S. Cl.
USPC ........................................... 242/388.6

(58) Field of Classification Search
USPC ............... 242/388, 388.1, 388.6, 378, 378.4
See application file for complete search history.

(56) References Cited

U.S. PATENT DOCUMENTS

| | | |
|---|---|---|
| 1,137,133 A | 4/1915 | Hamelback |
| 1,276,825 A | 8/1918 | Swope |
| 2,206,352 A | 7/1940 | Hellmann |
| 2,605,060 A | 7/1952 | Bell |
| 2,874,918 A | 2/1959 | Steiber |
| 2,905,409 A | 9/1959 | Sheldon |
| 3,120,355 A | 2/1964 | Bowman |
| 3,632,061 A | 1/1972 | Roseboom |
| 3,822,834 A | 7/1974 | Fjarlie |
| 3,831,879 A | 8/1974 | Miller et al. |
| 4,008,791 A | 2/1977 | Shafii-Kahany et al. |
| 4,055,314 A | 10/1977 | Kovaleski |
| 4,111,380 A | 9/1978 | Heuckroth |
| 4,186,897 A | 2/1980 | Brown |
| 4,222,535 A | 9/1980 | Hosbein |
| 4,282,954 A | 8/1981 | Hill |
| 4,565,333 A | 1/1986 | Meneian |
| 4,978,191 A | 12/1990 | Hasegawa et al. |
| 5,022,600 A | 6/1991 | Blanc et al. |
| 5,058,259 A | 10/1991 | Araki et al. |

(Continued)

FOREIGN PATENT DOCUMENTS

| | | |
|---|---|---|
| JP | 2-296201 | 12/1990 |
| JP | 5-303018 | 11/1993 |

(Continued)

OTHER PUBLICATIONS

Decoiler Devices/Traverse Arms/Accessories, http://replay.web.archive.org/20060518044402/https://weldingsupply.securesites.com/, 4 pages (May 18, 2006).

(Continued)

*Primary Examiner* — Emmanuel M Marcelo
*Assistant Examiner* — Angela Caligiuri
(74) *Attorney, Agent, or Firm* — Merchant & Gould P.C.

(57) ABSTRACT

A spool system for a telecommunications cable. The spool system winds-up and pays-out the cable without accumulating twist in the cable. The spool system can also pay out a distal end of the cable and mount a proximal end of the cable. Because no twist is accumulated in the cable, the first end and/or the second end of the cable can remain connected while the spool system is winding-up or paying-out. The spool system includes a base, a cable unwrapper, and a hub. The cable unwrapper and the hub rotate in opposite directions from each other. A first cable wrapping area is provided on the base and a second cable wrapping area is provided on the hub.

20 Claims, 6 Drawing Sheets

(56) References Cited

U.S. PATENT DOCUMENTS

| | | | |
|---|---|---|---|
| 5,069,523 A | 12/1991 | Finzel et al. | |
| 5,078,466 A | 1/1992 | MacCulloch | |
| 5,098,028 A | 3/1992 | Ida et al. | |
| 5,165,543 A | 11/1992 | Heyda et al. | |
| 5,268,986 A | 12/1993 | Kakii et al. | |
| 5,277,314 A | 1/1994 | Cooper et al. | |
| 5,332,171 A | 7/1994 | Steff | |
| 5,335,874 A | 8/1994 | Shrum et al. | |
| 5,388,781 A * | 2/1995 | Sauber | 242/388.6 |
| 5,450,509 A | 9/1995 | Davis | |
| 5,481,607 A | 1/1996 | Hsiao | |
| 5,494,446 A | 2/1996 | DeLucia et al. | |
| 5,544,836 A | 8/1996 | Pera | |
| 5,607,316 A | 3/1997 | Ishikawa | |
| 5,669,571 A | 9/1997 | Graybill | |
| 5,679,015 A | 10/1997 | Schauer | |
| 5,758,834 A | 6/1998 | Dragoo et al. | |
| 5,797,558 A | 8/1998 | Peterson et al. | |
| 5,913,487 A | 6/1999 | Leatherman | |
| 5,915,062 A | 6/1999 | Jackson et al. | |
| 5,921,497 A | 7/1999 | Utley, Jr. | |
| 5,993,229 A | 11/1999 | Tanaka et al. | |
| 5,996,930 A | 12/1999 | Katayama et al. | |
| 6,077,108 A | 6/2000 | Lorscheider et al. | |
| 6,215,938 B1 | 4/2001 | Reitmeier et al. | |
| 6,220,413 B1 | 4/2001 | Walters et al. | |
| 6,250,578 B1 | 6/2001 | Manda | |
| 6,260,781 B1 | 7/2001 | Cooper | |
| 6,305,958 B1 | 10/2001 | Maegawa et al. | |
| 6,325,665 B1 | 12/2001 | Chung | |
| 6,328,243 B1 | 12/2001 | Yamamoto | |
| 6,349,893 B1 | 2/2002 | Daoud | |
| 6,361,237 B1 | 3/2002 | Salmela | |
| 6,375,109 B1 | 4/2002 | Liao | |
| 6,405,961 B1 | 6/2002 | Mastrangelo | |
| 6,433,274 B1 | 8/2002 | Doss et al. | |
| 6,484,958 B1 | 11/2002 | Xue et al. | |
| 6,522,826 B2 | 2/2003 | Gregory | |
| 6,572,393 B2 | 6/2003 | Kawamura | |
| RE38,211 E | 8/2003 | Peterson et al. | |
| 6,616,080 B1 | 9/2003 | Edwards et al. | |
| 6,643,443 B2 | 11/2003 | Holman et al. | |
| 6,643,445 B2 | 11/2003 | Bumgarner et al. | |
| 6,744,954 B1 | 6/2004 | Tanaka et al. | |
| 6,795,633 B2 | 9/2004 | Joseph, II | |
| 6,819,848 B2 | 11/2004 | Takahashi | |
| 6,856,748 B1 | 2/2005 | Elkins, II et al. | |
| 6,915,058 B2 | 7/2005 | Pons | |
| 7,017,846 B2 | 3/2006 | Tsoi et al. | |
| 7,036,761 B2 | 5/2006 | Washington et al. | |
| 7,086,512 B2 | 8/2006 | Shack et al. | |
| 7,104,491 B2 | 9/2006 | Vinding | |
| 7,116,883 B2 | 10/2006 | Kline et al. | |
| 7,120,349 B2 | 10/2006 | Elliott | |
| 7,182,286 B2 | 2/2007 | Huang | |
| 7,266,283 B2 | 9/2007 | Kline et al. | |
| 7,315,681 B2 | 1/2008 | Kewitsch | |
| 7,357,666 B2 | 4/2008 | Wu | |
| 7,369,739 B2 | 5/2008 | Kline et al. | |
| 7,460,753 B2 | 12/2008 | Kewitsch | |
| 7,548,679 B2 | 6/2009 | Hirano et al. | |
| 7,599,598 B2 | 10/2009 | Gniadek et al. | |
| 7,627,218 B2 | 12/2009 | Hurley | |
| 7,680,386 B2 | 3/2010 | Hurley | |
| 2002/0122643 A1 | 9/2002 | Bueschelberger et al. | |
| 2003/0059192 A1 | 3/2003 | Johnson | |
| 2003/0095773 A1 | 5/2003 | Ichinari et al. | |
| 2004/0211851 A1 | 10/2004 | Barton et al. | |
| 2006/0045458 A1 | 3/2006 | Sasaki et al. | |
| 2006/0264921 A1 | 11/2006 | Deutsch et al. | |
| 2007/0196053 A1 | 8/2007 | Kewitsch | |
| 2008/0019642 A1 | 1/2008 | Kewitsch | |
| 2008/0273844 A1 | 11/2008 | Kewitsch | |
| 2008/0292261 A1 | 11/2008 | Kowalczyk et al. | |
| 2009/0060441 A1 | 3/2009 | Kowalczyk et al. | |
| 2009/0074370 A1 | 3/2009 | Kowalczyk et al. | |
| 2009/0097797 A1 | 4/2009 | Kewitsch | |
| 2010/0329621 A1 | 12/2010 | Makrides-Saravanos et al. | |
| 2011/0024543 A1 | 2/2011 | Smrha | |
| 2011/0024544 A1 | 2/2011 | Smrha et al. | |

FOREIGN PATENT DOCUMENTS

| | | |
|---|---|---|
| JP | 2000-284129 | 10/2000 |
| JP | 2003-29059 | 1/2003 |
| JP | 2003-329850 | 11/2003 |
| JP | 2003-329851 | 11/2003 |
| WO | WO 2006/015343 A2 | 2/2006 |
| WO | WO 2006/078007 A1 | 7/2006 |

OTHER PUBLICATIONS

Decoiler Devices/Traverse Arms/Accessories, https://weldingsupply.securesites.com/yeoweld-fax.html, 5 pages (Date Printed May 2, 2011).

Catalogue-Fastening Solutions—RICHO—(Version JPG)—p. 227, 3 pages (Date Unknown).

Fiber Management, Richco, p. 211 (Date Unknown).

Fiberlaunch, 4 pages (Copyright 2010).

Fibre Fastening and Routing Components, Richco, pp. 54-72 (Date Unknown).

Fibre Winding Reel, Europlus Technologies plc, 2 pages (Date Unknown).

Telescent Catalog Fiber Optic Connectivity, pp. 1-39 (Copyright 2007).

* cited by examiner

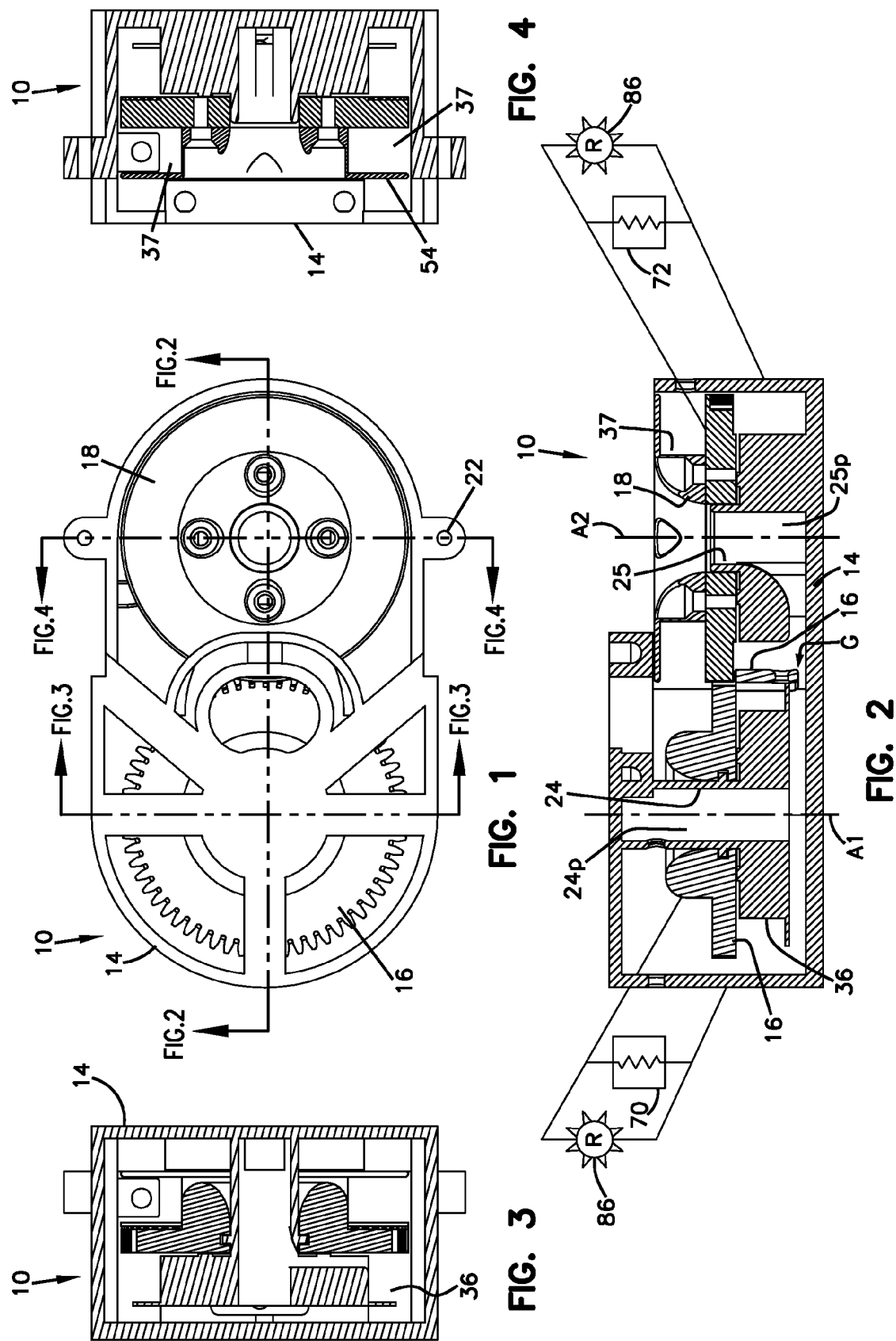

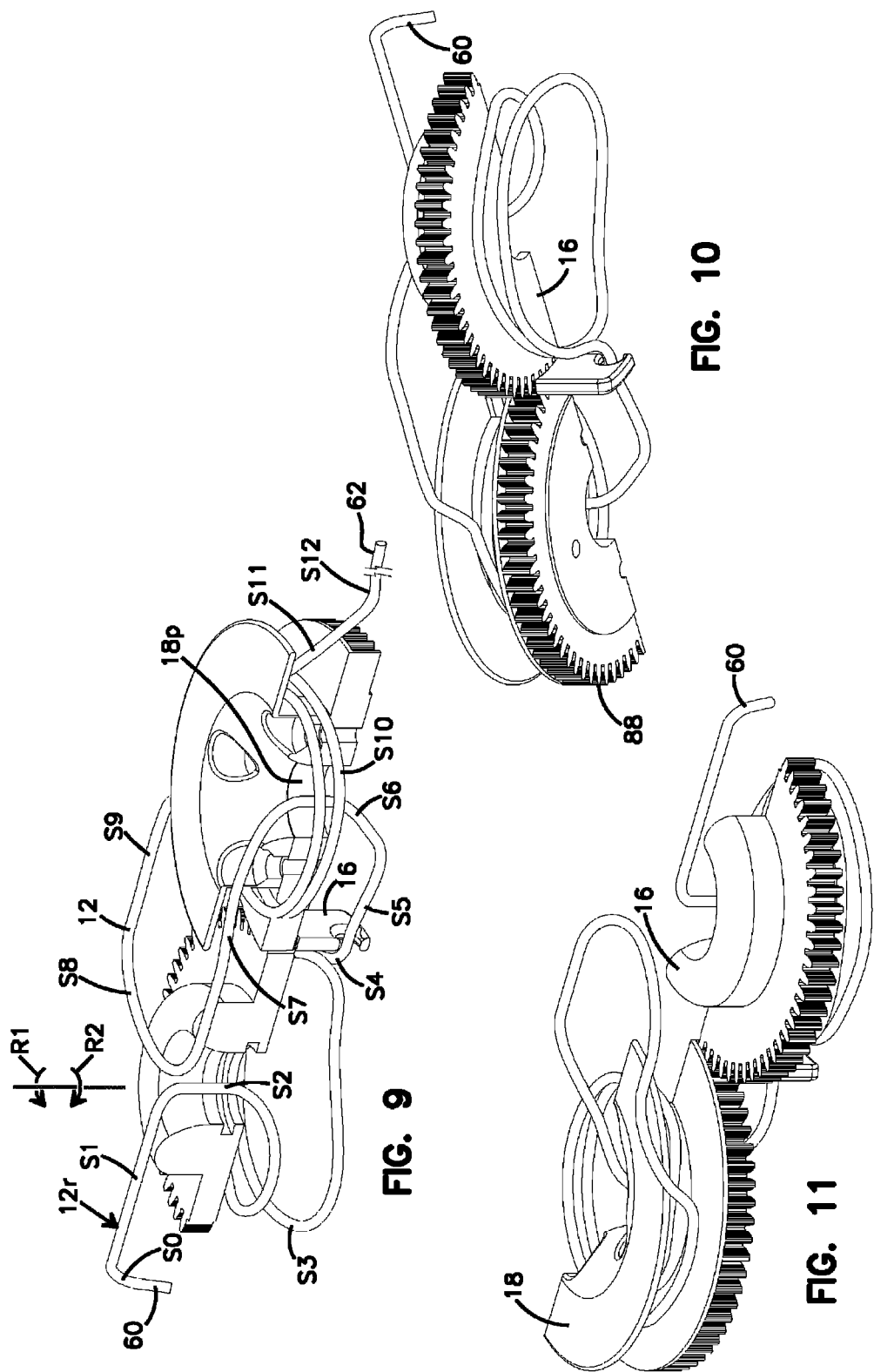

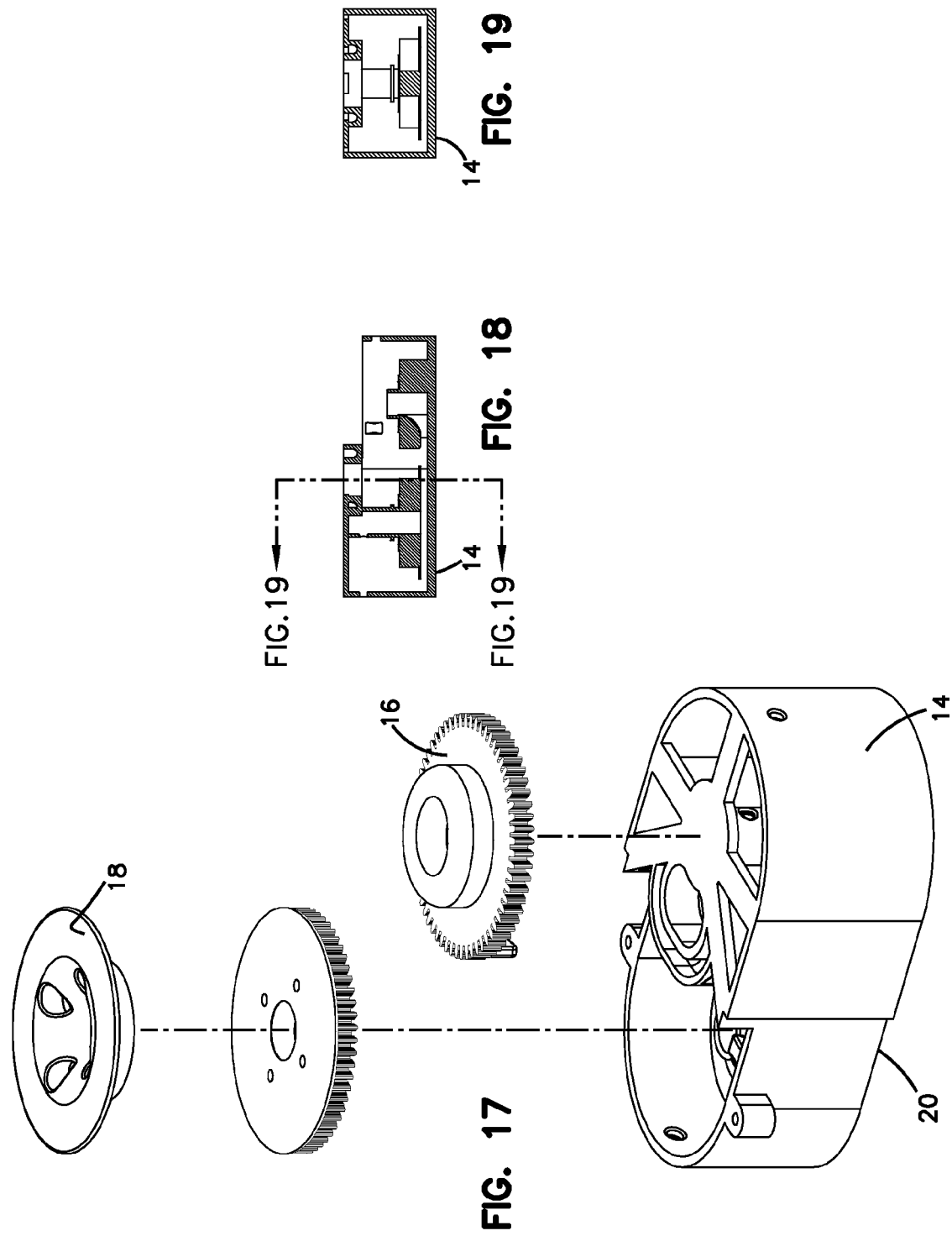

SPOOL FOR TELECOMMUNICATIONS CABLE AND METHOD

BACKGROUND

Spools or reels can be used to store telecommunications cable (e.g., electrical cable and/or fiber optic cable). The spools include a hub or a drum about which the cable is wound. The hub of the spools is often cylindrical, and the cable is often wrapped around the cylindrical hub in a predominantly circumferential manner. By winding up the cable on the spool, the cable can be compactly stored and transported, protected from tangling and kinking, and kept ready for easy deployment.

SUMMARY

Features of the present disclosure relate to a spool system for a telecommunications cable. The spool system includes the telecommunications cable, a base, a cable unwrapper, and a hub. The telecommunications cable extends between a first end and a second end and can be connectorized at one or both ends. The telecommunications cable can be a fiber optic cable, an electrical cable, or a hybrid cable including both optical and electrical conductors.

The base includes a first mount, a second mount, that is spaced from the first mount, and a first cable wrapping area about which a first portion of the telecommunications cable is wrapped. The base can be secured to a cabinet, a wall, or other object. The first mount of the base includes a first central passage for routing the telecommunications cable from the first end to the first cable wrapping area. The second mount of the base includes a second central passage.

The cable unwrapper includes a rotating cable guide that guides the first portion of the telecommunications cable off of the first cable wrapping area. The cable unwrapper rotatably mounts to the first mount with the rotating cable guide orbiting about the first cable wrapping area when the cable unwrapper is rotated.

The hub includes a central opening and a second cable wrapping area about which a second portion of the telecommunications cable is wrapped. The hub rotatably mounts to the second mount of the base. In a preferred embodiment, the hub is rotationally coupled to the cable unwrapper in such a way that the hub and the cable unwrapper rotate in opposite rotational directions from each other. In a depicted embodiment, a pair of gears rotationally couples the hub to the cable unwrapper.

The telecommunications cable is routed between the first cable wrapping area and the second cable wrapping area via the second central passage of the second mount of the base and via the central opening of the hub. A transferred portion of the telecommunications cable is transferred from the first cable wrapping area to the second cable wrapping area via the rotating cable guide when a paid-out portion of the telecommunications cable is paid out of the spool system from the second cable wrapping area. The transferred portion of the telecommunications cable is transferred from the second cable wrapping area to the first cable wrapping area via the rotating cable guide when the paid-out portion of the telecommunications cable is retracted into the spool system and onto the second cable wrapping area.

The spool of the present disclosure is able to pay-out the telecommunications cable without causing the accumulation of twist in the cable. The spool can also pay out the second end of the telecommunication cable and mount the first end of the telecommunication cable. Because no twist is accumulated in the telecommunication cable, the first end and/or the second end of the telecommunication cable can remain connected while the spool is paying-out.

In preferred embodiments, the spool system and method allows for winding up of the cable, such as for winding up excess unneeded cable slack, or full retraction when the cable is no longer in use or not in use.

These and other features and advantages will be apparent from a reading of the following detailed description and a review of the associated drawings. It is to be understood that both the forgoing general description and the following detailed description are explanatory only and are not restrictive of the broad aspects of the disclosure.

BRIEF DESCRIPTION OF THE DRAWINGS

FIG. 1 is a top plan view of a spool system for a telecommunications cable in accordance with the principles of the present disclosure;

FIG. 2 is a cross-sectional elevation view of FIG. 1;

FIG. 3 is a cross-sectional elevation view of FIG. 1;

FIG. 4 is a cross-sectional elevation view of FIG. 1;

FIG. 9 is a perspective view of a cable unwrapper and a hub of the spool system of FIG. 1 with the telecommunications cable shown whole and a half of the cable unwrapper and the hub cut away;

FIG. 10 is another perspective view of the cable unwrapper and the hub of FIG. 9 with the telecommunications cable shown whole and the half of the cable unwrapper and the hub cut away;

FIG. 11 is still another perspective view of the cable unwrapper and the hub of FIG. 9 with the telecommunications cable shown whole and the half of the cable unwrapper and the hub cut away;

FIG. 17 is an exploded perspective view of the spool system of FIG. 1;

FIG. 18 is a cross-sectional elevation view of the base of FIG. 5;

FIG. 19 is a cross-sectional elevation view of the base of FIG. 5 taken at FIG. 18;

DETAILED DESCRIPTION

Figure 5:
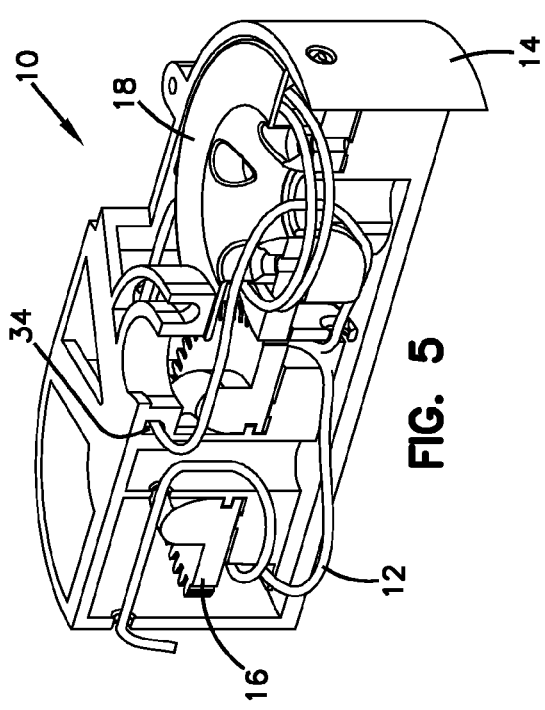
FIG. 5 is a perspective view of the spool system of FIG. 1 with a half of a base of the spool system cut away.
Figure 6:
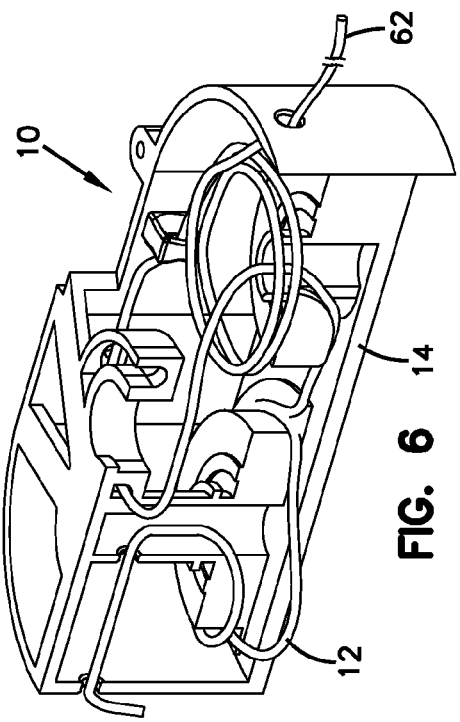
FIG. 6 is a view similar to FIG. 5 but with only the base and the telecommunications cable shown.

It is often desirable to deploy a telecommunications cable with a length of the telecommunications cable varying for various purposes. For example, it may be desired to connect the telecommunications cable to various ports that vary in location and/or distance from each other.

FIGS. 1-8 illustrate a spool system 10 for a telecommunications cable 12 in accordance with the principles of the present disclosure. The spool system 10 includes a base 14, a cable unwrapper 16, a hub 18, and a cover 20. The preferred spool system 10 allows for one end of the telecommunications cable 12 to be extended and retracted from and to the spool system 10 while the opposite end of the telecommunications cable 12 remains stationary. The extension and retraction can be done without causing twists in the telecommunications cable 12. Refraction is useful for retracting extra cable pulled from the spool system 10. It is also desirable to retract a telecommunications cable when the telecommunications cable is not connected and thereby keep the telecommunications cable from cluttering a cabinet and/or a work area, etc.

As depicted, the base 14 of the spool system 10 is adapted for stationary mounting and includes mounting holes 22 or other features to mount the spool system 10. The base 14 includes a mount 24 and thereby defines an axis A1 and also includes a mount 25 thereby defines an axis A2 (see FIG. 2). As depicted at FIG. 2, the mount 24 and the mount 25 are held by the base 14 on opposite sides (i.e, the mount 24 is held at a top side and the mount 25 is held at a bottom side). This mounting arrangement facilitates a cable routing of the telecommunications cable 12, further described below. The base 14 can include a connector mount (not shown) for mounting a connector 28, such as an LC, SC, MPO, that terminates the telecommunications cable 12 (see FIG. 7). The connector mount can mount an adapter, such as an LC, SC, MPO, that, in turn, can connect with the connector 28. The base 14 can include cable guide features 34 (see FIGS. 5 and 7) to guide the telecommunications cable 12 between a cable wrapping area 36 of the base 14 and a cable wrapping area 37 of the hub 18 (see FIG. 2). In applications where the telecommunications cable 12 is a fiber optic cable, the cable guide features 34 are adapted to prevent the fiber optic cable from bending sharply (e.g., bending that would cause an optical fiber within the fiber optic cable to be bent sharper than a minimum bend radius. The cable wrapping areas 36, 37 can be predominantly cylindrical surfaces. In applications where the telecommunications cable 12 is the fiber optic cable, the radii of the cable wrapping areas 36, 37 can be greater than the minimum bend radius.

Figure 14:
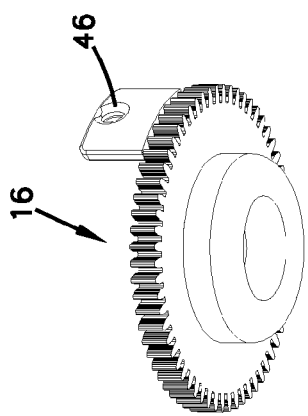
FIG. 14 is a perspective view of the cable unwrapper of FIG. 9.
Figure 13:
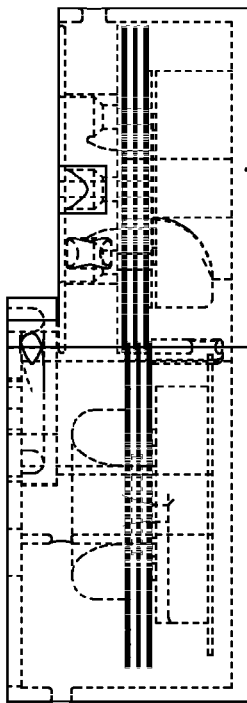
FIG. 13 is an elevation view of the base of FIG. 5 with certain hidden lines shown.
Figure 12:
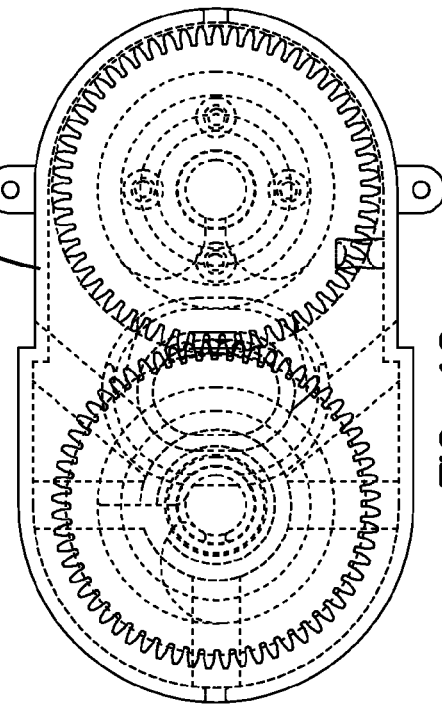
FIG. 12 is a bottom plan view of the spool system of FIG. 1 with certain hidden lines shown.
Figure 20:
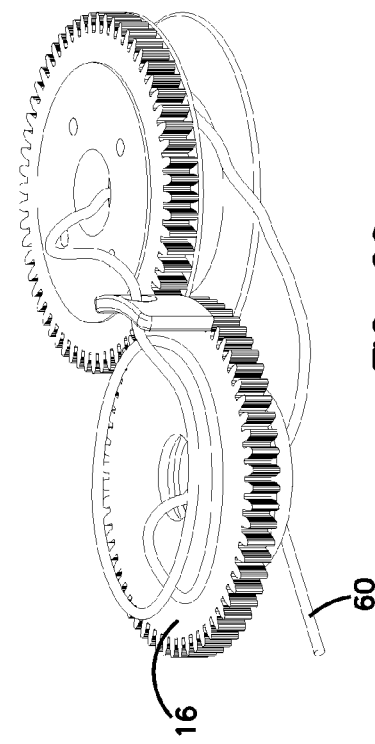
FIG. 20 is a perspective view of the cable unwrapper and the hub of FIG. 9 at a first position with the telecommunications cable.

The base 14 rotatably mounts the cable unwrapper 16 about the axis A1. The cable unwrapper 16 can include bearings adapted to mount on the mount 24 of the base 14. The cable unwrapper 16 includes a cable guide 46 (see FIG. 14). In applications where the telecommunications cable 12 is the fiber optic cable, the radius defined by the cable unwrapper 16 can be greater than the minimum bend radius. As depicted, the cable guide 46 includes a hole with a radial configuration with respect to the axis A1. In other embodiments, the cable guide 46 can be other shapes and/or have other orientations.

Figure 16:
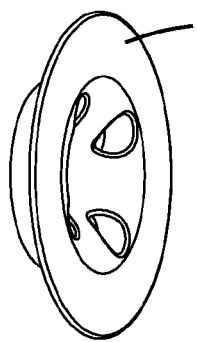
FIG. 16 is another perspective view of another portion of the hub of FIG. 9.

As depicted, the base 14 rotatably mounts the hub 18 about the axis A2. The hub 18 can include bearings adapted to mount on the mount 25 of the base 14. The hub 18 includes the cable wrapping area 37. The hub 18 can include a flange 54 adjacent the cable wrapping area 37 (see FIGS. 4 and 16). The flange 54 can serve to keep the telecommunications cable 12 from slipping off of the hub 18.

Figure 7:
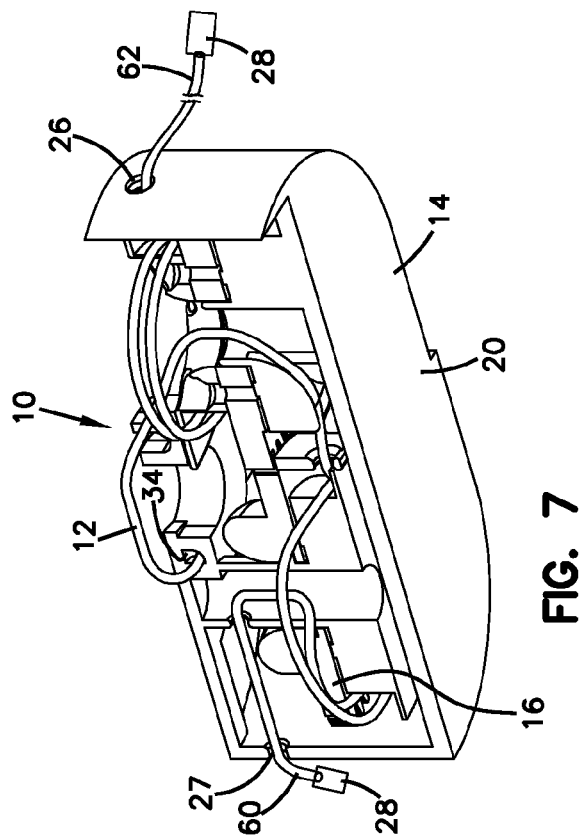
FIG. 7 is another perspective view of the spool system of FIG. 1 with the half of the base of the spool system cut away.
Figure 8:
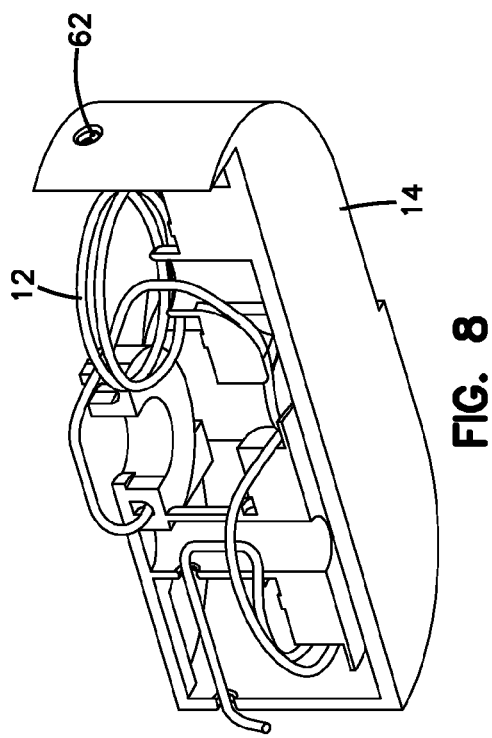
FIG. 8 is a view similar to FIG. 7 but with only the base and the telecommunications cable shown.
Figure 21:
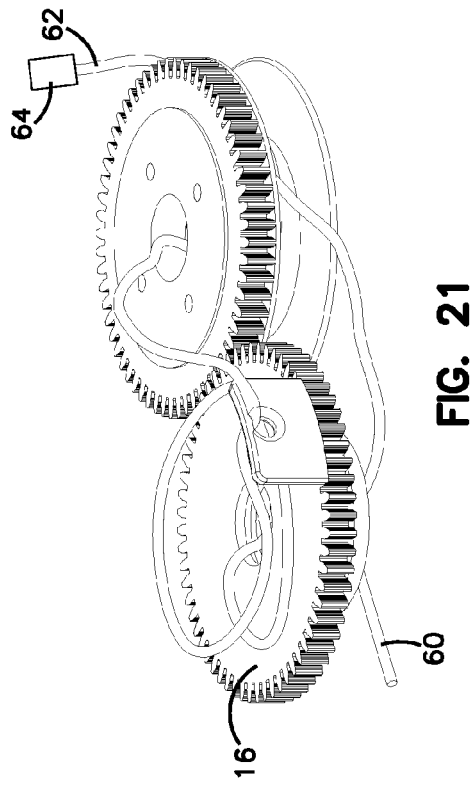
FIG. 21 is a perspective view of the cable unwrapper and the hub of FIG. 9 at a second position with the telecommunications cable.
Figure 22:
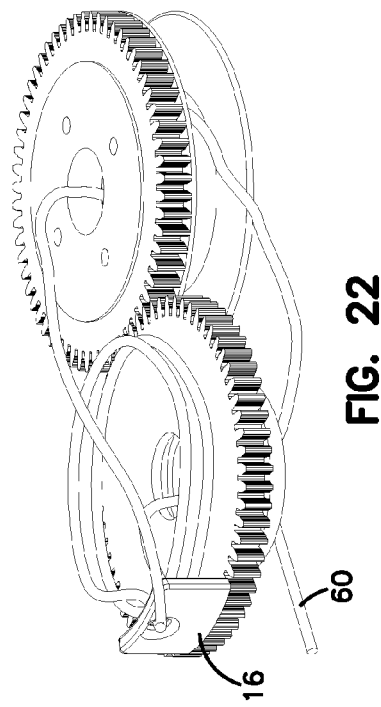
FIG. 22 is a perspective view of the cable unwrapper and the hub of FIG. 9 at a third position with the telecommunications cable.
Figure 23:
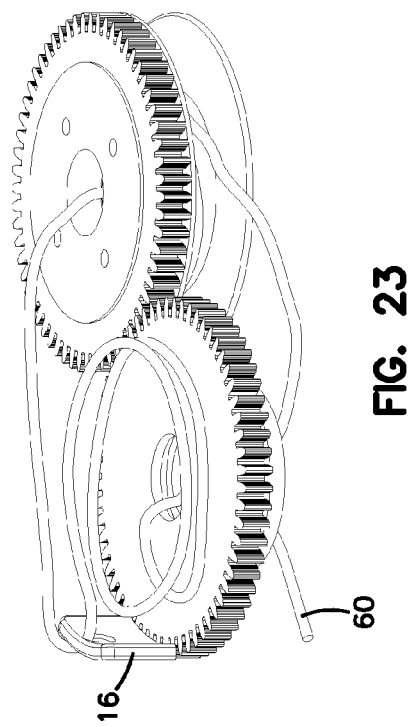
FIG. 23 is a perspective view of the cable unwrapper and the hub of FIG. 9 at a fourth position with the telecommunications cable.

The base 14 of the spool system 10 can hold a first end 60 of the telecommunications cable 12 (see FIG. 7). Alternatively, the first end 60 of the telecommunications cable 12 can be free of the base 14, and the telecommunications cable 12 can pass through the base 14. The first end 60 can be any desired length, for example 6 inches to 2 feet. A second end 62 of the telecommunications cable 12 can be extended from the spool system 10. The second end 62 of the telecommunications cable 12 can be terminated by a connector 64, such as an LC, SC, MPO, (see FIG. 21). The second end 62 of the telecommunications cable 12 can be extended (i.e., paid out) from the spool system 10 by pulling on the second end 62 in a direction away from the spool system 10. The second end 62 can be any desired length, such as 5-20 feet.

The spool system 10 can include a spring 70 connected between the cable unwrapper 16 and the base 14 (see FIG. 2). The spool system 10 can include a spring 72 connected between the hub 18 and the base 14 (see FIG. 2). The spring 70 can urge the cable unwrapper 16 to rotate about the rotation axis A1 when the spring 70 is wound. The cable guide 46 of the cable unwrapper 16 is adapted to wrap the telecommunications cable 12 about the cable wrapping area 36 when the cable unwrapper 16 is rotated by the spring 70. The cable wrapping area 37 of the hub 18 is adapted to feed the telecommunications cable 12 from the cable wrapping area 37 to the cable guide 46 of the cable unwrapper 16 when the cable unwrapper 16 is rotated by the spring 70. The cable wrapping area 37 is adapted to wrap the telecommunications cable 12 adjacent the second end 62 when the cable unwrapper 16 is rotated by the spring 70.

The spool system 10 can include a ratchet connected between the cable unwrapper 16 and the base 14. The ratchet is adapted to allow the telecommunications cable 12 to be paid-out from the spool system 10 and hold the spring 70, 72 from urging the cable unwrapper 16 from rotating about the rotation axis A1 when the spring 70, 72 is wound. The ratchet can be releasable by various methods known in the art.

The spool system 10 can include a ratchet 86 connected between the hub 18 and the base 14 and/or the cable unwrapper 16 and the base (see FIG. 2). The ratchet 86 is adapted to allow the telecommunications cable 12 to be paid-out from the spool system 10 and hold the spring 70, 72 from urging the hub 18 from rotating about the rotation axis A2 when the spring 70, 72 is wound. The ratchet 86 can be releasable by various methods known in the art.

Certain hubs of certain spools and cable wrapping areas of certain spools can be non-cylindrical (e.g., hexagonal, square, rectangular, etc.).

The mount 24 of the base 14 includes a passage 24p for the telecommunications cable 12. The mount 25 of the base 14 includes a passage 25p for the telecommunications cable 12. The passage 24p continues from the mount 24 to the cable wrapping area 36. The passage 25p continues from the mount 25 and opens toward the cable wrapping area 36 (see FIG. 2).

The hub 18 includes the cable wrapping area 37. The hub 18 is rotatably mounted to the mount 25 about the axis A2. The hub 18 is rotationally coupled to the cable unwrapper 16 such that the hub 18 and the cable unwrapper 16 rotate in opposite rotational directions from each other. The cable guide 34 guides the telecommunications cable 12 between the passage 25p of the mount 25 and the cable wrapping area 37 of the hub 18.

A cable support 27 can be mounted to or integrated with the base 14 and is adapted to hold the first end portion 60 of the telecommunications cable 12 (see FIG. 7). A cable exit 26 for the telecommunications cable 12 can be mounted to or integrated with the base 14. The cable wrapping area 37 of the hub 18 is adapted to pay-out the telecommunications cable 12 through the cable exit 26 when the second end portion 62 of the telecommunications cable 12 is pulled away from the spool system 10 at the cable exit 26.

A route 12r for the telecommunications cable 12 through the spool system 10 includes (see FIG. 9): a first segment S1 between the cable support 27 of the base 14 and the passage 24p of the mount 24; a second segment S2 through the passage 24p of the mount 24 and to the cable wrapping area 36; a third segment S3 about the cable wrapping area 36; a fourth segment S4 between the cable wrapping area 36 and the rotating cable guide 46; a fifth segment S5 between the rotating cable guide 46 and the passage 25p of the mount 25; a sixth segment S6 through the passage 25p of the mount 25; a seventh segment S7 between the passage 25p of the mount 25 and the cable guide 34; an eighth segment S8 about the cable guide 34; a ninth segment S9 between the cable guide 34 and the cable wrapping area 37; a tenth segment S10 about the cable wrapping area 37; and an eleventh segment S11 between the cable wrapping area 37 and the cable exit 26. Another segment S0 may be before the first segment S1. The segment S0 may be a pigtail, etc. The segment S0 may be stored within the base 14. Yet another segment S12 is the paid-out portion of the telecommunications cable 12.

The third and the tenth segments, S3 and S10, are reduced in length and the segment S12 is increased in length when the cable unwrapper 16 rotates in a first rotational direction R1 (see FIG. 9). The third and the tenth segments, S3 and S10, are increased in length and the segment S12 is reduced in length when the cable unwrapper 16 rotates in a second rotational direction R2 (see FIG. 9). Length is transferred from the segment S3 to S10 and from S10 to S12 when the cable unwrapper 16 rotates in the first rotational direction R1. Length is transferred from the segment S10 to S3 and from S12 to S10 when the cable unwrapper 16 rotates in the second rotational direction R2.

The fourth segment S4 of the route 12r can occasionally pass through a gap G between the base 14 and the cable unwrapper 16 (see FIG. 2).

In certain embodiments, the spool system 10 may only pay-out the telecommunications cable 12. In these embodiments, the cable unwrapper 16 may only unwrap the telecommunications cable 12. In other embodiments, the spool system 10 may pay-out and retract the telecommunications cable 12. In these embodiments, the cable unwrapper 16 may wrap and unwrap the telecommunications cable 12. In certain embodiments where the spool system 10 only pays-out the telecommunications cable 12, the telecommunications cable 12 may be manually wound and/or reset. In certain embodiments where the spool system 10 only pays-out the telecommunications cable 12, the telecommunications cable 12 may be wound and/or reset by special tooling and/or accessories (e.g., production tooling at a factory). In certain embodiments where the spool system 10 both retracts and pays-out the telecommunications cable 12, the telecommunications cable 12 may be manually wound and/or reset (e.g., if tangled). In certain embodiments where the spool system 10 both retracts and pays-out the telecommunications cable 12, the telecommunications cable 12 may be wound and/or reset by special tooling and/or accessories (e.g., production tooling at a factory).

The principles of the present disclosure also include a method of wrapping the telecommunications cable 12 about the spool system 10. The method includes: 1) wrapping a first portion of the segment S3 of the telecommunications cable 12 onto the cable wrapping area 36 by orbiting the rotating cable guide 46 about the cable wrapping area 36; 2) simultaneously wrapping a second portion of the segment S10 of the telecommunications cable 12 onto the cable wrapping area 37 of the hub 18 by retracting a paid-out portion of the segment S12 of the telecommunications cable 12 into the spool system 10 and thereby subtracting the second wrapped portion of the segment S10 from the segment S12; and 3) simultaneously transferring the first portion of the segment S3 of the telecommunications cable 12 from the cable wrapping area 37 to the cable wrapping area 36 via the rotating cable guide 46 and via a central passage 18p of the hub 18.

The principles of the present disclosure also include a method of unwrapping the telecommunications cable 12 from the spool system 10. The method includes: 1) unwrapping a first portion of the segment S3 of the telecommunications cable 12 from the cable wrapping area 36 by orbiting the rotating cable guide 46 about the cable wrapping area 36; 2) simultaneously unwrapping a second portion of the segment S10 of the telecommunications cable 12 from the cable wrapping area 37 of the hub 18 by pulling a paid-out portion of the segment S12 of the telecommunications cable 12 from the spool system 10 and thereby adding the second unwrapped portion of the segment S10 to the segment S12; and 3) simultaneously transferring the first portion of the segment S3 of the telecommunications cable 12 from the cable wrapping area 37 to the cable wrapping area 36 via the rotating cable guide 46 and via the central passage 18p of the hub 18.

The spool system 10 can be powered by the pulling of the telecommunications cable 12, the spring 70, 72 of the spool, a hand crank, a motor, and various other means.

Figure 15:
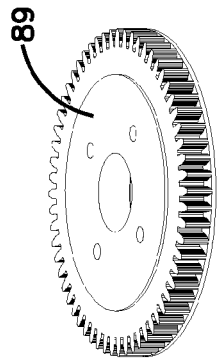
FIG. 15 is a perspective view of a portion of the hub of FIG. 9.

The cable unwrapper 16 and the hub 18 of the spool system 10 are depicted as geared to one another by a gear set 88 (see FIG. 10) including gears 89 (see FIG. 15). The gear set 88 causes the hub 18 to turn oppositely from the cable unwrapper 16. The telecommunications cable 12, in combination with its above described routing, can also rotationally constrain the cable unwrapper 16 and the hub 18 of the spool system 10 to one another.

The telecommunications cable 12 is wound/unwound without causing twists in the telecommunications cable 12, even though one end of the telecommunications cable 12 remains stationary.

The telecommunications cable 12 can be the fiber optic cable, an electrical cable, or other cables such as a hybrid fiber optic/electrical cable. The telecommunications cable 12 can be a multi-fiber fiber optic telecommunications cable and the connector 28 can be a multi-fiber fiber optic connector. In other embodiments, the telecommunications cable 12 can be a single-fiber fiber optic telecommunications cable and the connector 28 can be a single-fiber fiber optic connector. The connector 28 terminates the telecommunications cable 12 and can be connected with the adapter 30.

From the forgoing detailed description, it will be evident that modifications and variations can be made without departing from the spirit and scope of the disclosure.

What is claimed is:

1. A spool system for a telecommunications cable, the spool system comprising:
a base including a cable support, a first mount, a second mount, and a first cable wrapping area, the first mount of the base defining a first rotation axis and the second mount of the base defining a second rotation axis spaced from the first rotation axis, the first mount of the base including a first passage for the telecommunications cable and the second mount of the base including a second passage for the telecommunications cable, the first passage continuing from the first mount to the first cable wrapping area and the second passage continuing from the second mount and opening toward the first cable wrapping area;

a cable unwrapper including a rotating cable guide adapted for guiding the telecommunications cable off of the first cable wrapping area, the cable unwrapper rotatably mounted to the first mount about the first rotation axis and the rotating cable guide orbiting about the first cable wrapping area when the cable unwrapper is rotated about the first rotation axis;

a hub including a second cable wrapping area, the hub rotatably mounted to the second mount about the second rotation axis, the hub rotationally coupled to the cable unwrapper such that the hub and the cable unwrapper rotate in opposite rotational directions from each other;

a cable guide for guiding the telecommunications cable between the second passage of the second mount and the second cable wrapping area of the hub;

a cable exit for the telecommunications cable, the cable exit mounted to the base;

wherein the cable support of the base is adapted to hold a first end portion of the telecommunications cable;

wherein the cable unwrapper rotates in a first rotational direction and the hub rotates in an opposite second rotational direction when the rotating cable guide guides the telecommunications cable off of the first cable wrapping area; and wherein the second cable wrapping area of the hub is adapted to pay-out the telecommunications cable through the cable exit when a second end portion of the telecommunications cable is pulled away from the spool system at the cable exit.

2. The spool system of claim 1, wherein the cable unwrapper is also a cable wrapper when rotated in the second rotational direction about the first rotation axis and thereby adapted to cause the rotating cable guide to guide the telecommunications cable onto the first cable wrapping area, wherein the hub rotates in the first rotational direction when the cable wrapper rotates in the second rotational direction; and wherein the second cable wrapping area of the hub is adapted to retract the telecommunications cable through the cable exit when the hub rotates in the first rotational direction and thereby adapted to pull the second end portion of the telecommunications cable toward the cable exit of the spool system.

3. The spool system of claim 2, wherein the cable wrapper is adapted to receive the telecommunications cable guided onto the first cable wrapping area from the second cable wrapping area of the hub.

4. The spool system of claim 2, further comprising a route for the telecommunications cable through the spool system including a first segment between the cable support of the base and the first passage of the first mount, a second segment through the first passage of the first mount and to the first cable wrapping area, a third segment about the first cable wrapping area, a fourth segment between the first cable wrapping area and the rotating cable guide, a fifth segment between the rotating cable guide and the second passage of the second mount, a sixth segment through the second passage of the second mount, a seventh segment between the second passage of the second mount and the cable guide, an eighth segment about the cable guide, a ninth segment between the cable guide and the second cable wrapping area, a tenth segment about the second cable wrapping area, and an eleventh segment between the second cable wrapping area and the cable exit, wherein the third and the tenth segments are increased in length when the cable wrapper rotates in the second rotational direction.

5. The spool system of claim 4, wherein the telecommunications cable includes an optical fiber and a smallest radius of the route is greater than a minimum bend radius of the optical fiber.

6. The spool system of claim 2, further comprising a spring connected between the cable unwrapper and the base, the spring urging the cable unwrapper to rotate in the second rotational direction, wherein the rotating cable guide of the cable unwrapper is adapted to wrap the telecommunications cable about the first cable wrapping area when the cable unwrapper is rotated by the spring.

7. The spool system of claim 6, further comprising a ratchet connected between the cable unwrapper and the base, wherein the ratchet is adapted to allow the telecommunications cable to be paid-out from the second cable wrapping area and wherein the ratchet is adapted to hold the spring from urging the cable unwrapper to rotate about the first rotation axis when the spring is wound.

8. The spool system of claim 7, wherein the ratchet is selectively releasable.

9. The spool system of claim 1, wherein the second cable wrapping area of the hub is adapted to receive the telecommunications cable unwrapped from the first cable wrapping area by the cable unwrapper.

10. The spool system of claim 1, further comprising a route for the telecommunications cable through the spool system including a first segment between the cable support of the base and the first passage of the first mount, a second segment through the first passage of the first mount and to the first cable wrapping area, a third segment about the first cable wrapping area, a fourth segment between the first cable wrapping area and the rotating cable guide, a fifth segment between the rotating cable guide and the second passage of the second mount, a sixth segment through the second passage of the second mount, a seventh segment between the second passage of the second mount and the cable guide, an eighth segment about the cable guide, a ninth segment between the cable guide and the second cable wrapping area, a tenth segment about the second cable wrapping area, and an eleventh segment between the second cable wrapping area and the cable exit, wherein the third and the tenth segments are reduced in length when the cable unwrapper rotates in the first rotational direction.

11. The spool system of claim 1, wherein the telecommunications cable includes an electrical conductor.

12. The spool system of claim 1, wherein the cable exit is adapted to tangentially guide the telecommunications cable off of the second cable wrapping area of the hub when the second end portion of the telecommunications cable is pulled away from the spool system.

13. A spool system for a telecommunications cable, the spool system comprising:
the telecommunications cable including a first end and a second end;
a base including a first mount, a second mount spaced from the first mount, and a first cable wrapping area about which a first portion of the telecommunications cable is wrapped, the first mount of the base including a first central passage for routing the telecommunications cable from the first end to the first cable wrapping area, and the second mount of the base including a second central passage;
a cable unwrapper including a rotating cable guide for guiding the first portion of the telecommunications cable off of the first cable wrapping area, the cable unwrapper rotatably mounted to the first mount and the rotating cable guide orbiting about the first cable wrapping area when the cable unwrapper is rotated;

a hub including a central opening and a second cable wrapping area about which a second portion of the telecommunications cable is wrapped, the hub rotatably mounted to the second mount, the hub rotationally coupled to the cable unwrapper such that the hub and the cable unwrapper rotate in opposite rotational directions from each other;

wherein the telecommunications cable is routed between the first cable wrapping area and the second cable wrapping area via the second central passage of the second mount of the base;

wherein the telecommunications cable is routed between the first cable wrapping area and the second cable wrapping area via the central opening of the hub;

wherein a transferred portion of the telecommunications cable is transferred from the first cable wrapping area to the second cable wrapping area via the rotating cable guide when a paid-out portion of the telecommunications cable is paid out of the spool system from the second cable wrapping area.

14. The spool system of claim 13, wherein the cable unwrapper is also a cable wrapper and the rotating cable guide is adapted to guide the telecommunications cable onto the first cable wrapping area.

15. The spool system of claim 14, wherein the transferred portion of the telecommunications cable is transferred from the second cable wrapping area to the first cable wrapping area via the rotating cable guide when the paid-out portion of the telecommunications cable is retracted into the spool system and onto the second cable wrapping area.

16. The spool system of claim 15, wherein the telecommunications cable includes an optical fiber.

17. The spool system of claim 14, further comprising a spring connected between the cable wrapper and the base, the spring urging the cable wrapper to wrap the telecommunications cable about the first cable wrapping area.

18. The spool system of claim 13, wherein the hub includes a spool and the second cable wrapping area is include on the spool.

19. A method of unwrapping a telecommunications cable from a spool system, the method comprising:

unwrapping a first portion of the telecommunications cable from a first cable wrapping area of a base of the spool system by orbiting a rotating cable guide of the spool system about the first cable wrapping area;

simultaneously unwrapping a second portion of the telecommunications cable from a second cable wrapping area of a hub of the spool system by pulling a paid-out portion of the telecommunications cable from the spool system and thereby adding the second unwrapped portion to the paid-out portion; and simultaneously transferring the first portion of the telecommunications cable from the first cable wrapping area to the second cable wrapping area via the rotating cable guide and via a central passage of the hub.

20. A method of wrapping a telecommunications cable onto a spool system, the method comprising:

wrapping a first portion of the telecommunications cable onto a first cable wrapping area of a base of the spool system by orbiting a rotating cable guide of the spool system about the first cable wrapping area;

simultaneously wrapping a second portion of the telecommunications cable onto a second cable wrapping area of a hub of the spool system by retracting a paid-out portion of the telecommunications cable into the spool system and thereby subtracting the second wrapped portion from the paid-out portion; and simultaneously transferring the first portion of the telecommunications cable from the second cable wrapping area to the first cable wrapping area via the rotating cable guide and via a central passage of the hub.

* * * * *